US007346923B2

(12) United States Patent
Atkins et al.

(10) Patent No.: US 7,346,923 B2
(45) Date of Patent: Mar. 18, 2008

(54) FEDERATED IDENTITY MANAGEMENT WITHIN A DISTRIBUTED PORTAL SERVER

(75) Inventors: Barry D. Atkins, Raleigh, NC (US); David O. Melgar, Raleigh, NC (US); Anthony J. Nadalin, Austin, TX (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/719,490

(22) Filed: Nov. 21, 2003

(65) Prior Publication Data

US 2005/0114701 A1 May 26, 2005

(51) Int. Cl.
G06F 7/06 (2006.01)
(52) U.S. Cl. ............... 726/6; 726/4; 726/5; 726/12; 726/18
(58) Field of Classification Search ............... 726/1–5, 726/4–6, 12, 18; 709/225, 229, 206, 223–224
See application file for complete search history.

(56) References Cited

U.S. PATENT DOCUMENTS

| | | | |
|---|---|---|---|
| 5,634,053 A | 5/1997 | Noble et al. | |
| 5,774,551 A | 6/1998 | Wu et al. | |
| 5,864,843 A | 1/1999 | Cariño, Jr. et al. | |
| 5,931,900 A | 8/1999 | Notani et al. | |
| 5,943,671 A | 8/1999 | Kleewein et al. | |
| 5,995,945 A | 11/1999 | Notani et al. | |
| 6,212,561 B1* | 4/2001 | Sitaraman et al. | 709/225 |
| 6,222,533 B1 | 4/2001 | Notani et al. | |
| 6,226,745 B1 | 5/2001 | Widerhold | |
| 6,304,892 B1 | 10/2001 | Bhoj et al. | |
| 6,332,130 B1 | 12/2001 | Notani et al. | |
| 7,130,885 B2* | 10/2006 | Chandra et al. | 709/206 |
| 7,131,000 B2* | 10/2006 | Bradee | 713/164 |
| 7,134,137 B2* | 11/2006 | Joshi et al. | 726/1 |
| 2001/0027484 A1 | 10/2001 | Nishi | |
| 2004/0111519 A1* | 6/2004 | Fu et al. | 709/229 |

OTHER PUBLICATIONS

Ostrowski, M and Coutts, R., *Interdomain Security Issues for IN Based Services*. IEEE.IEEE Intelligent Network Workshop IN'96. ISBN: 0-7803-3280-x (14 pages).
*Extending the Concepts of Suite and Application Beans to the J2EE Framework*.Research Disclosure No. 453, Article 151, p. 135(1 page).
Solana, Eduardo et al., "Flexible Internet Secure Transactions Based on Collaborative Domains", Security Protocols, 5th International Workshop Proceedings, Springer-Verlag, Berlin, Germany (1998) (p. 37-51).

(Continued)

*Primary Examiner*—T. B. Truong
(74) *Attorney, Agent, or Firm*—Marcia L. Doubet; Andre M. Gibbs

(57) ABSTRACT

Techniques are disclosed for federating identity management within a distributed portal server, leveraging Web services techniques and a number of industry standards. Identities are managed across autonomous security domains which may be comprised of independent trust models, authentication services, and user enrollment services. The disclosed techniques enable integrating third-party Web services-based portlets, which rely on various potentially-different security mechanisms, within a common portal page.

18 Claims, 9 Drawing Sheets

OTHER PUBLICATIONS

Nielsen, Henrik Frystyk et al., "Web Services Routing Protocol (WS-Routing)", Oct. 23, 2001, Microsoft Corporation (p. 1-27).

Della-Libera, Giovanni et al., "Security in a Web Services World: A Proposed Architecture and Roadmap", Apr. 1, 2002, International Business Machines Corporation and Microsoft Corporation (p. 1-24).

Atkinson, Bob et al., "Specification: Web Services Security (WS-Security) Version 1.0", Apr. 5, 2002, International Business Machines Corporation, Microsoft Corporation, Verisign, Inc. (p. 1-35).

"Emerging Technologies Toolkit", Apr. 8, 2003, IBM Corporation, printed Oct. 29, 2003, <http://www.alphaworks.ibm.com/aw.nsf/FAQs/ettk> (p. 1-53).

Della-Libera, Giovanni et al., "Federation of Identities in a Web Services World", Jul. 2003, IBM Corporation and Microsoft Corporation (p. 1-15).

Bajaj, Siddarth et al., "Specification: Web Services Federation Language (WS-Federation)", Jul. 8, 2003, IBM Corporation, Microsoft Corporation, BEA Systems, Inc., RSA Security, Inc., Verisign, Inc. (p. 1-53).

"Build Web services with IBM developer kits", IBM Corporation, printed Nov. 1, 2003, <http://www-106.ibm.com/developerworks/offers/webservices/start/> (p. 1-2).

* cited by examiner

```xml
<?xml version="1.0" encoding="UTF-8"?>
<SOAP-ENV:Envelope
  SOAP-ENV:encodingStyle="http://schemas.xmlsoap.org/soap/encoding/"
  xmlns:SOAP-ENC="http://schemas.xmlsoap.org/soap/encoding/"
  xmlns:SOAP-ENV="http://schemas.xmlsoap.org/soap/envelope/"
  xmlns:xsd="http://www.w3.org/2001/XMLSchema"
  xmlns:xsi="http://www.w3.org/2001/XMLSchema-instance">

<SOAP-ENV:Header>
<wsse:Security xmlns:wsse="http://schemas.xmlsoap.org/ws/2002/04/secext">
 <Signature xmlns="http://www.w3.org/2000/09/xmldsig#">
  <SignedInfo>
    <CanonicalizationMethod Algorithm="http://www.w3.org/2001/10/xml-exc-c14n#"/>
    <SignatureMethod Algorithm="http://www.w3.org/2000/09/xmldsig#dsa-sha1"/>

<Reference URI="#soap_content_1018917500125">
      <Transforms>
        <Transform Algorithm="http://www.w3.org/2001/10/xml-exc-c14n#"/>
      </Transforms>
      <DigestMethod Algorithm="http://www.w3.org/2000/09/xmldsig#sha1"/>
      <DigestValue>ZOA9kwsm9CFZrx6qPzbKn5kVye0=</DigestValue>
    </Reference>

<Reference URI="#Id_1018917500115">
      <Transforms>
        <Transform Algorithm="http://www.w3.org/2001/10/xml-exc-c14n#"/>
      </Transforms>
      <DigestMethod Algorithm="http://www.w3.org/2000/09/xmldsig#sha1"/>
      <DigestValue>nAuak7tKR7P685N8+gmujE82ggk=</DigestValue>
    </Reference>
  </SignedInfo>

<SignatureValue>
    RnlaILXdxZ3MrEfQLRsCW3y3y60lvmd+rSvqfe+m1JMZNX6Z+3yOvQ==
  </SignatureValue>

<KeyInfo>
    <KeyName>cedar-trail-wps1</KeyName>
  </KeyInfo>
 </Signature>
```

```
          ┌ <wsse:UsernameToken Id="Id_1018917500115">
          │   <wsse:Username>sally@cedar.net</wsse:Username>631
630       │   <wsse:Password>federate</wsse:Password>632
          └ </wsse:UsernameToken>

</wsse:Security>

</SOAP-ENV:Header>

┌ <SOAP-ENV:Body>
          │   <ns1:publish id="soap_content_1018917500125"
          │             xmlns:ns1="http://tempuri.org/trustProxy1">
640       │     <arg0 xsi:type="xsd:string">MultiDomainAuth/Request/domain1</arg0> 641
          │     <arg1 xsi:type="xsd:string"/>
          │   </ns1:publish>
          └ </SOAP-ENV:Body>

</SOAP-ENV:Envelope>
```

```xml
<?xml version="1.0" encoding="UTF-8"?>
<SOAP-ENV:Envelope
  SOAP-ENV:encodingStyle="http://schemas.xmlsoap.org/soap/encoding/"
  xmlns:SOAP-ENC="http://schemas.xmlsoap.org/soap/encoding/"
  xmlns:SOAP-ENV="http://schemas.xmlsoap.org/soap/envelope/"
  xmlns:xsd="http://www.w3.org/2001/XMLSchema"
  xmlns:xsi="http://www.w3.org/2001/XMLSchema-instance">

<SOAP-ENV:Header>
<wsse:Security xmlns:wsse="http://schemas.xmlsoap.org/ws/2002/04/secext">
 <Signature xmlns="http://www.w3.org/2000/09/xmldsig#">
 <SignedInfo>
   <CanonicalizationMethod Algorithm="http://www.w3.org/2001/10/xml-exc-c14n#"/>
   <SignatureMethod Algorithm="http://www.w3.org/2000/09/xmldsig#dsa-sha1"/>

<Reference URI="#soap_content_1018917562665">
    <Transforms>
      <Transform Algorithm="http://www.w3.org/2001/10/xml-exc-c14n#"/>
    </Transforms>
    <DigestMethod Algorithm="http://www.w3.org/2000/09/xmldsig#sha1"/>
    <DigestValue>TF4tZ+y30wfJxu+YW8OhPMzuKCU=</DigestValue>
   </Reference>

<Reference URI="#Id_1018917562655">
    <Transforms>
      <Transform Algorithm="http://www.w3.org/2001/10/xml-exc-c14n#"/>
    </Transforms>
    <DigestMethod Algorithm="http://www.w3.org/2000/09/xmldsig#sha1"/>
    <DigestValue>epb5eOjbyj1Ail3e9EE2CcY1ye4=</DigestValue>
   </Reference>
 </SignedInfo>

<SignatureValue>
   Tp/d6OG2Oay4UBFgi/Q+7I6o4O+J/YIpWH4ewYgE3wSPdapmV5nylQ==
 </SignatureValue>

<KeyInfo>
   <KeyName>securityGateway2A</KeyName> 720
 </KeyInfo>
 </Signature>
```

FIG. 7B

```
      ┌<wsse:UsernameToken Id="Id_1018917562655">
730│    <wsse:Username>spjenkins@sfs.com</wsse:Username>731
      │    <wsse:Password>investments-R-Us</wsse:Password> 732
      └</wsse:UsernameToken>

</wsse:Security>

</SOAP-ENV:Header>

┌<SOAP-ENV:Body>
      │    <ns1:publish id="soap_content_1018917562665"
      │             xmlns:ns1="http://tempuri.org/trustProxy2">
740│    <arg0 xsi:type="xsd:string">MultiDomainAuth/Response/domain2A</arg0>741
      │    <arg1 xsi:type="xsd:string">Permit</arg1>742
      │    </ns1:publish>
      └</SOAP-ENV:Body>

</SOAP-ENV:Envelope>
```

FEDERATED IDENTITY MANAGEMENT WITHIN A DISTRIBUTED PORTAL SERVER

BACKGROUND OF THE INVENTION

1. Field of the Invention

The present invention relates to computer software, and deals more particularly with techniques for federated identity management within a distributed Web portal (or similar aggregation framework), for example to seamlessly provide access to a plurality of aggregated views or services which may have different identity requirements.

2. Description of the Related Art

Web portals (sometimes referred to equivalently as portal platforms, portal systems, or portal servers) are designed to serve as a gateway, or focal point, for access to an aggregation or collection of information and applications from many different sources. Portals often provide an end user view, commonly referred to as a "portal page". A portal page is often structured as a single overview-style page (which may provide links for the user to navigate to more detailed information). Alternatively, portal pages may be designed using a notebook paradigm whereby multiple pages are available to the user upon selecting a tab for that page. (Other frameworks which aggregate content and/or services may have characteristics analogous to those of a portal. The term "portal", as used herein, is intended to include such other aggregation frameworks.)

In addition to providing for content delivery to end users, Web portals are increasingly used as gateways to so-called "Web services" (i.e., network-accessible services) for distributed computing. Web services are a rapidly emerging technology for distributed application integration in a distributing computing environment such as the Internet. In general, a "Web service" is an interface that describes a collection of network-accessible operations. Web services fulfill a specific task or a set of tasks. They may work with one or more other Web services in an interoperable manner to carry out their part of a complex workflow or a business transaction. For example, completing a complex purchase order transaction may require automated interaction between an order placement service (i.e., order placement software) at the ordering business and an order fulfillment service at one or more of its business partners.

With Web services, distributed network access to software becomes widely available for program-to-program operation, without requiring intervention from humans. Web services are generally structured using a model in which an enterprise providing network-accessible services publishes the services to a network-accessible registry, and other enterprises needing services (or human beings searching for network-accessible services) are able to query the registry to learn of the services' availability. (Hereinafter, references to an entity or user making use of Web services are intended to include programmatic entities as well as human beings.) The participants in this computing model are commonly referred to as (1) service providers, (2) service requesters, and (3) service brokers. These participants, and the fundamental operations involved with exchanging messages between them, are illustrated in FIG. 1. The service providers 100 are the entities having services available, and the registry to which these services are published 110 is maintained by a service broker 120. The service requesters 150 are the entities needing services and querying 140 the service broker's registry. When a desired service is found using the registry, the service requester binds 130 to the located service provider in order to use the service. These operations are designed to occur programmatically, without requiring human intervention, such that a service requester can search for a particular service and make use of that service dynamically, at run-time. The Web services model is theoretically available for any type of computing application.

Web services allow applications and services (referred to hereinafter as services for ease of reference) to interact with one another using Web-based standards. A number of standards are being promulgated in the Web services arena as the problems inherent in that environment become better understood. A complete discussion of these protocols is beyond the scope of the present discussion, but basic protocols on which Web services work is being built include HTTP ("Hypertext Transfer Protocol"), SOAP ("Simple Object Access Protocol"), and WSDL ("Web Services Description Language"). HTTP is commonly used to exchange messages over TCP/IP ("Transmission Control Protocol/Internet Protocol") networks such as the Internet. SOAP is an XML ("Extensible Markup Language") based protocol used to send messages for invoking methods in a distributed environment. WSDL is an XML format for describing distributed network services.

For more information on SOAP, refer to "Simple Object Access Protocol (SOAP) 1.1, W3C Note 08 May 2000", which is available on the Internet at http://www.w3.org/TR/SOAP. The WSDL specification is titled "Web Services Description Language (WSDL) 1.1, W3C Note 15 Mar. 2001", and may be found on the Internet at http://www.w3.org/TR/wsdl. HTTP is described in Request For Comments ("RFC") 2616 from the Internet Engineering Task Force, titled "Hypertext Transfer Protocol—HTTP/1.1" (June 1999). It should be noted that references herein to "HTTP" are intended in a generic sense to refer to HTTP-like functions. Some Web services operations, for example, require HTTPS instead of HTTP, where HTTPS is a security-enhanced version of HTTP.

The goal of Web services is to provide service requesters with transparent access to program components which may reside in one or more remote locations, even though those components might run on different operating systems and be written in different programming languages than those of the requester.

While support for Web services and portals continues to make great progress, areas remain where improvements can be made.

SUMMARY OF THE INVENTION

An object of the present invention is to provide federated identity management within a distributed Web portal.

Another object of the present invention is to provide federated identity management for a plurality of aggregated views or services which are to be provided within a Web portal.

A further object of the present invention is to define techniques for allowing end users to have seamless access to a plurality of aggregated views or services which may have different identity requirements.

Yet another object of the present invention is to define techniques for allowing seamless access to views or services for which an end user has more than one identity, without requiring the user to repeatedly provide his identity information.

Still another object of the present invention is to define techniques for managing identities across autonomous security domains which may use independent trust models, authentication services, and/or user enrollment services.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and computer program products. In one aspect of preferred embodiments, the present invention provides cross-domain authentication in a computing environment. Preferably, this comprises: providing security credentials of an entity to an initial point of contact in the computing environment; passing the provided credentials from the initial point of contact to a trust proxy; authenticating the passed credentials with an authentication service in a local security domain of the trust proxy; and using the authentication performed by the local authentication service to seamlessly authenticate the entity to one or more selected remote security domains.

Using the authentication preferably further comprises consulting policy information to determine which of a plurality of remote security domains should be selected to receive information from the local authentication service and passing the information from the local authentication service to each of the determined remote security domains.

Using the authentication enables remote services in the selected remote security domains to be accessed by the entity without requiring the entity to provide its security credentials for those remote services. A credential mapping operation is preferably performed to map the provided security credentials to the entity's security credentials for each remote service.

The entity may be an end user. In alternative aspect, the entity may be a programmatic entity. The initial point of contact may be, for example, a portal interface or a framework providing an aggregation of a plurality of Web services.

Passing the credentials may be done by a proxy of the initial point of contact. This proxy preferably performs a protocol conversion, when passing the provided credentials, from a first protocol (such as HTTP or HTTPS) used when the credentials were provided to a second protocol (such as SOAP) used by the trust proxy.

Using the authentication may further comprise forwarding a security token from the local authentication service to a remote trust proxy in each of the selected remote security domains and using the forwarded security token, at each of the remote trust proxies, to authenticate the entity with an authentication service in the remote security domain. Results of the authentication by the authentication service in the local security domain and results of each authentication by the authentication services in each selected remote security domain are preferably returned to the initial point of contact. The initial point of contact then preferably determines which services and/or views thereof can be provided to the entity, based on the returned results.

The entity may have security credentials, in at least one of the selected remote security domains, that differ from the provided security credentials, in which case using the authentication performed by the local authentication service preferably further comprises transparently mapping the provided security credentials to the different security credentials.

In another aspect, the present invention enables an entity to have seamless access to a plurality of aggregated services which have different identity requirements, comprising: initially authenticating the entity, by a first authentication component, using an identity provided by the entity; mapping the provided identification to the differing identity requirements of at least one service to be aggregated, thereby establishing mapped identity requirements for each of the at least one services; subsequently authenticating the entity, by an authentication component associated with each of the at least one services, using the mapped identity requirements; and aggregating each of the at least one services and a service associated with the initial authentication component, if the authentications thereof are successful, into an aggregated result. The aggregated result is preferably an aggregated view.

In a further aspect, the present invention provides federated identity management within a distributed content aggregation framework, comprising: providing, to the content aggregation framework by a using entity, initial identity information; authenticating the initial identity information by a first authentication service in a first security domain; conveying results of the authentication by the first authentication service to one or more selected other authentication services associated with one or more other security domains; and using the conveyed results to authenticate the using entity to each of the selected other authentication services, without requiring the using entity to provide additional identity information. The initial identity information may be, for example, a name and password associated with the using entity.

The present invention will now be described with reference to the following drawings, in which like reference numbers denote the same element throughout.

BRIEF DESCRIPTION OF THE DRAWINGS

FIG. 6 (comprising FIGS. 6A and 6B) and FIG. 7 (comprising FIGS. 7A and 7B) provide sample message syntax for an authentication request and authentication response, respectively, according to preferred embodiments of the present invention.

DESCRIPTION OF PREFERRED EMBODIMENTS

Figure 1:
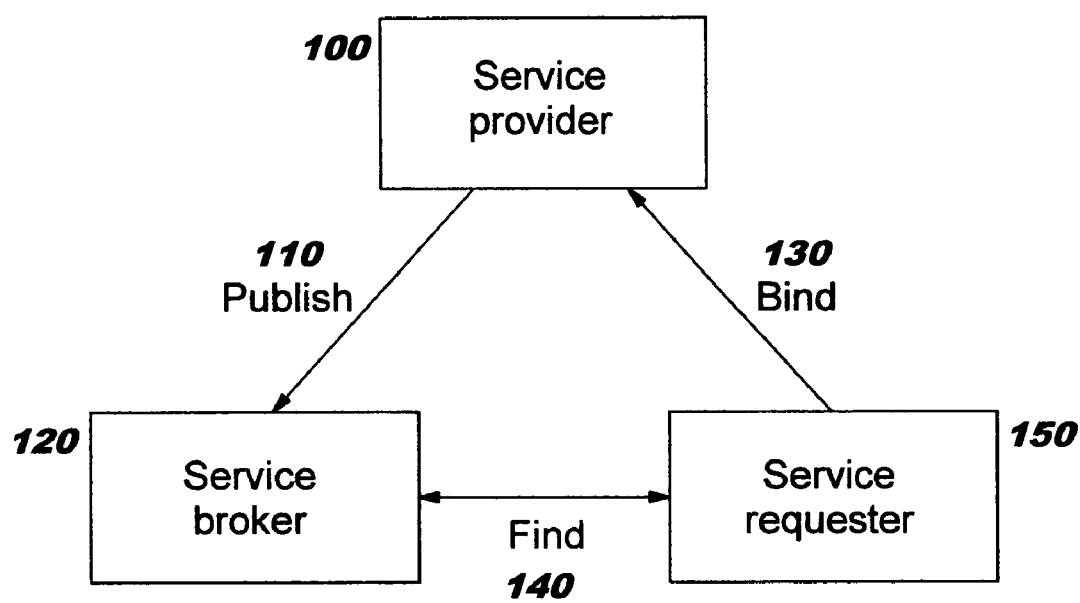
FIG. 1 provides a diagram illustrating participants and operations of a service-oriented architecture in which Web services are deployed, according to the prior art.

The present invention discloses techniques for federating identity management within a distributed portal server, leveraging Web services techniques and a number of industry standards. Identities are managed across autonomous security domains which may be comprised of independent trust models, authentication services, and user enrollment services. The disclosed techniques enable integrating third-party Web services-based portlets, which rely on various potentially-different security mechanisms, within a common portal page.

One commercially-available portal platform on which the present invention may be implemented is the WebSphere® Portal Server ("WPS") from the International Business Machines Corporation ("IBM"). ("WebSphere" is a registered trademark of IBM.) Note, however, that while discussions of the present invention are in terms of a portal platform, the inventive concepts are applicable to other types of content frameworks which provide analogous functionality and are also applicable to portals other than WPS, and thus references to portals and their portlet paradigm is by way of illustration and not of limitation.

Several of the industry standards which are leveraged by preferred embodiments will now be described.

A document titled "Security in a Web Services World: A Proposed Architecture and Roadmap" (hereinafter, "the roadmap"), published jointly by IBM and Microsoft Corporation on Apr. 1, 2002, discloses a security architecture and roadmap for providing security when using Web services. The roadmap proposes a strategy for addressing interoperable security within a Web services environment, via a progressive and iterative approach to defining specifications for various security-related functional areas including federation. A specification titled "Web Services Security (WS-Security), Version 1.0" and published Apr. 5, 2002 (also referred to herein as "WS-Security" or "the Web services security specification"), drafted jointly by IBM, Microsoft Corporation, and Verisign, defines techniques that may be used for Web services-based message security. These specifications are hereby incorporated herein by reference.

A specification titled "Web Services Federation Language (WS-Federation)" and published Jul. 8, 2003 (also referred to herein as "WS-Federation" or "the Web services federation specification"), drafted jointly by IBM, Microsoft Corporation, and Verisign, describes a model for integrating incompatible security mechanisms or security mechanisms that are deployed within different domains. For example, suppose two business partners each implement public key encryption-based identity infrastructures, or that one of the partners happens to implement a Kerberos system while the other trading partners do not. WS-Federation offers a roadmap for how to apply Web service technologies to tie those systems together, leveraging lower-level Web services security specifications that provide support for message security, policy, trust, and privacy. The Web services federation specification is hereby incorporated herein by reference. (The WS-Federation specification does not pre-date embodiments of the present invention. The roadmap, published in 2002, discussed, at a high level, an intent to address the problem space of WS-Federation, but provided no solution.)

A federation within a Web services context relates to collaboration among loosely-coupled and complementary Web services across security domains. For example, suppose employees from two companies would like to meet with one another, and that the two companies have different automated calendar/meeting services, each of which provides complementary functionality (e.g., by managing employee's schedules). Federating these complementary services would allow the independent calendar services to exchange application information, enabling the employees to establish the joint meeting.

A federated identity management system, as that term is used herein, generally comprises loosely-coupled authentication, user enrollment, and user profile management services, which may collaborate across security domains. In some cases, a federated identity management system may also include authorization services. Federated identity management allows services residing in disparate security domains to interoperate and collaborate securely, irrespective of the differences in the underlying security mechanisms and/or operating system platforms. In effect, the security mechanisms are programmatically tied together, or bridged, in a transparent manner in order to enable this interoperation and secure collaboration among services. Federated identity management is one of the key requirements for higher-level federation scenarios.

As an example of how other scenarios build upon federated identity management, consider trading partners where each partner manages an autonomous and insular supply chain. Federating the vendor supply chains would provide a greater degree of optimization across inventory, production, distribution, and transportation systems among the trading partners. This level of federation implies collaboration among enterprise resource planning ("ERP") systems and supply chain management decision support services hosted by the trading partners. Typically, each vendor's information technology systems provide security mechanisms that restrict access to core business processes to entities that are authenticated and determined to be authorized for this access. Without a flexible and interoperable means of federated identity management, the efficiencies associated with highly-optimized, collaborative supply chains is untenable. Using federated identity management, as disclosed herein, the necessary authorizations can be granted and subsequently verified at run time, and communicating entities can be authenticated (including authentication across security domains) to ensure that the trading partners (and only those trading partners) can access one another's supply chains in a seamless manner.

There are an unbounded number of federation scenarios that require federated identity management, including federating relationship management services, instant messaging services, and more. The Web Services Toolkit ("WSTK") Version 3.3, distributed by IBM on or after Nov. 25, 2002, provides a federated identity management proof-of-concept implementation (hereinafter, "the federated identity demo"), showing how a federated identity management system could be deployed that leverages the Web services security specification. The present invention adopts the architecture of the federated identity demo and leverages the Web services security and Web services federation specifications.

Preferred embodiments of the present invention apply federated identity management within a distributed portal environment. Accordingly, preferred embodiments also leverage the specification titled "Web Services for Remote Portals Specification, Version 1.0", which was approved as an OASIS ("Organization for the Advancement of Structured Information Standards") standard in August, 2003. This specification, referred to hereinafter as "WSRP", is hereby incorporated herein by reference.

Figure 2:
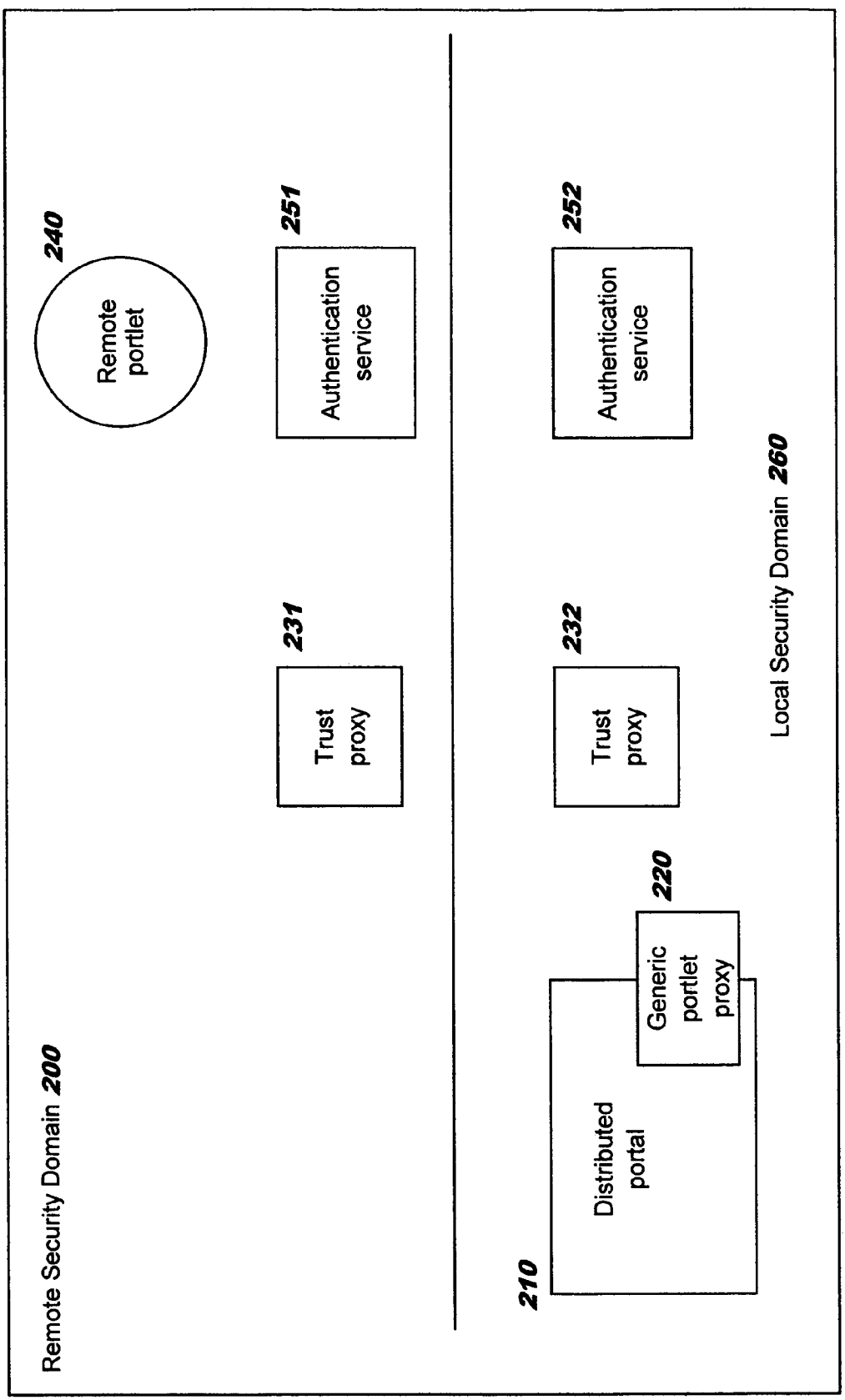
FIG. 2 illustrates components that may be used in preferred embodiments of the present invention.

Referring now to FIG. 2, components that may be used by preferred embodiments are illustrated with reference to a sample configuration. As shown therein, a distributed portal 210 acts as the federation entry point for end users. The distributed portal aggregates, within a common portal interface, various services (including third-party services) that span multiple independent security domains (shown in the figure as local security domain 260 and remote security domain 200).

In preferred embodiments, a generic portlet proxy 220 is responsible for protocol conversion of messages which are published to a local trust proxy 232 within local security domain 260. The generic portlet proxy 220 may, for example, convert HTTP requests received at portal 210 to WSRP-compliant SOAP messages that can be consumed at trust proxy 232 (and vice versa). (The term "generic portlet proxy", as used herein, refers to a portlet that acts as an intermediary between an application or software resource requesting a particular service and a software resource providing that service.)

In addition to local trust proxy 232, a remote trust proxy 231 is provided for remote security domain 200. A trust proxy, as the term is used herein, is a Web service that manages trust relationships and routes authentication-related messages between federation participants. Accordingly, local trust proxy 232 communicates with local authentication service 252 and remote trust proxy 231 communicates with remote authentication service 251, and the trust proxies 231, 232 exchange messages with one another.

Preferably, each trust proxy is configured with routing information and policy declarations (not shown) to ensure that messages are only sent to trusted parties (as determined by relationships established out-of-band between the various domains). Alternatively, routing information may be propagated within the context of a SOAP message via a stateless protocol such as the Web Services Routing protocol, defined in "Web Services Routing Protocol (WS-Routing)", published Oct. 23, 2001 by Microsoft Corporation. This protocol specification, also referred to herein as "WS-Routing", is hereby incorporated herein by reference.

In the example configuration of FIG. 2, a remote portlet 240 is provided in the remote domain. This remote portlet may provide various types of service, such as bank account information for customers of a bank, account-related information for holders of credit cards, access to the supply chain of a trading partner (as discussed earlier), and so forth. To provide secure access to this remote portlet 240 from distributed portal 210, it is necessary to provide cross-domain authentication, where a common subject (e.g., a user of distributed portal 210) may have varying security identities within the different security domains 200, 260. Preferably, end-to-end security in this type of cross-domain environment is provided for embodiments of the present invention to ensure that confidential information is not exposed to unintended third parties, and that critical information is not tampered with while in transit between the security domains.

Remote portlet 240 is termed a "relying" service, that is, a WSRP remote portlet Web service that consumes authentication information from a local or remote domain in order to provide a service to an already-authenticated user (or programmatic entity).

The sample configuration in FIG. 2 is provided for purposes of illustration and not of limitation. It may happen, for example, that more than two separate security domains exist in the configuration of an actual distributed portal scenario. (And, in some cases, a distributed portal scenario may include one or more remote portlets that do not require security services, in combination with one or more remote portlets that do require security services.)

The manner in which preferred embodiments provide federated identity management in an environment such as that illustrated in FIG. 2, enabling secure access to the relying service provided at remote portlet 240 as well as to a service provided in local security domain 260, will now be described in more detail.

Figure 3:
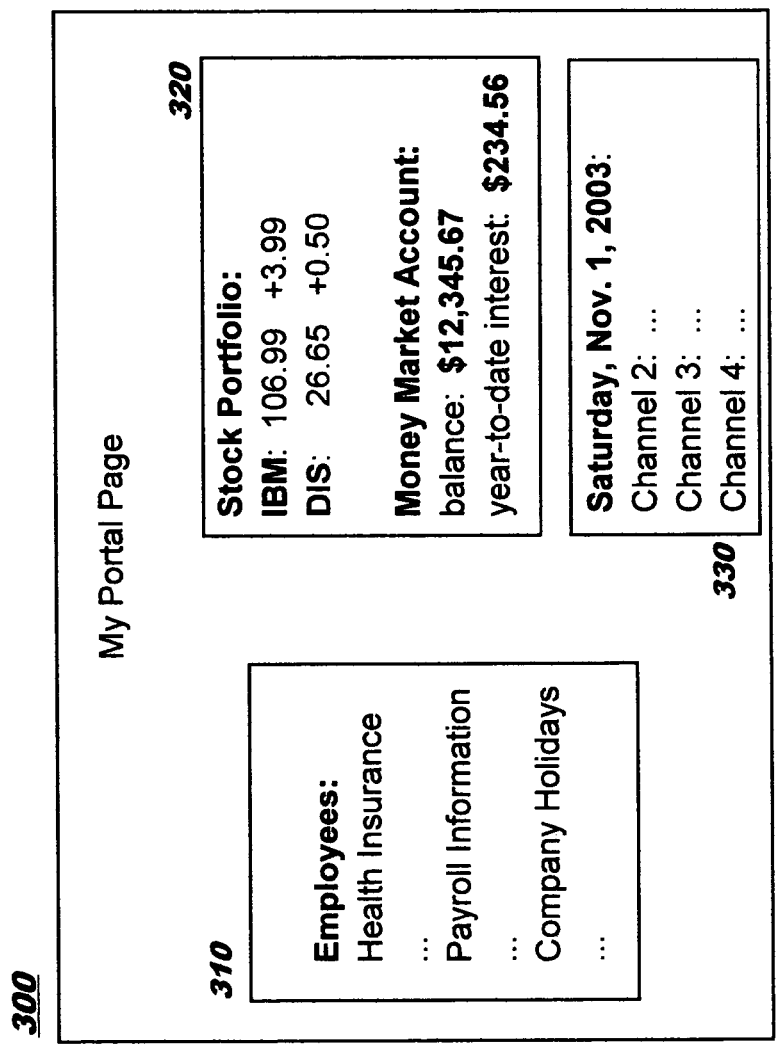
FIG. 3 depicts a sample portal page that is used to describe operation of preferred embodiments.

Preferred embodiments provide a portal interface to remote portlets which provide a service of some type (including access to a resource). Suppose that the sample portal page 300 shown in FIG. 3 is to be rendered for an end user. This is an example of visual "user-facing" Web services. (That is, these Web services have a user interface and allow for user interaction, such as presenting data to a user and processing events in response to user actions.) In this example, a hypothetical user named Sally Jenkins is an employee of a hypothetical company named Smith Financial Services ("SFS") that provides financial management services to consumers, and the portal page 300 is provided from Sally's customized portal interface. Sally's portal page 300, in this example, is configured to display information related to her employee benefits (see reference number 310), information related to the investments she has placed with SFS as a consumer (see reference number 320), and current television listings from a publicly-available television listing service (see reference number 330). The manner in which preferred embodiments use federated identity management to provide the views illustrated on this sample portal page will now be described in more detail with reference to FIGS. 4-7.

Figure 4:
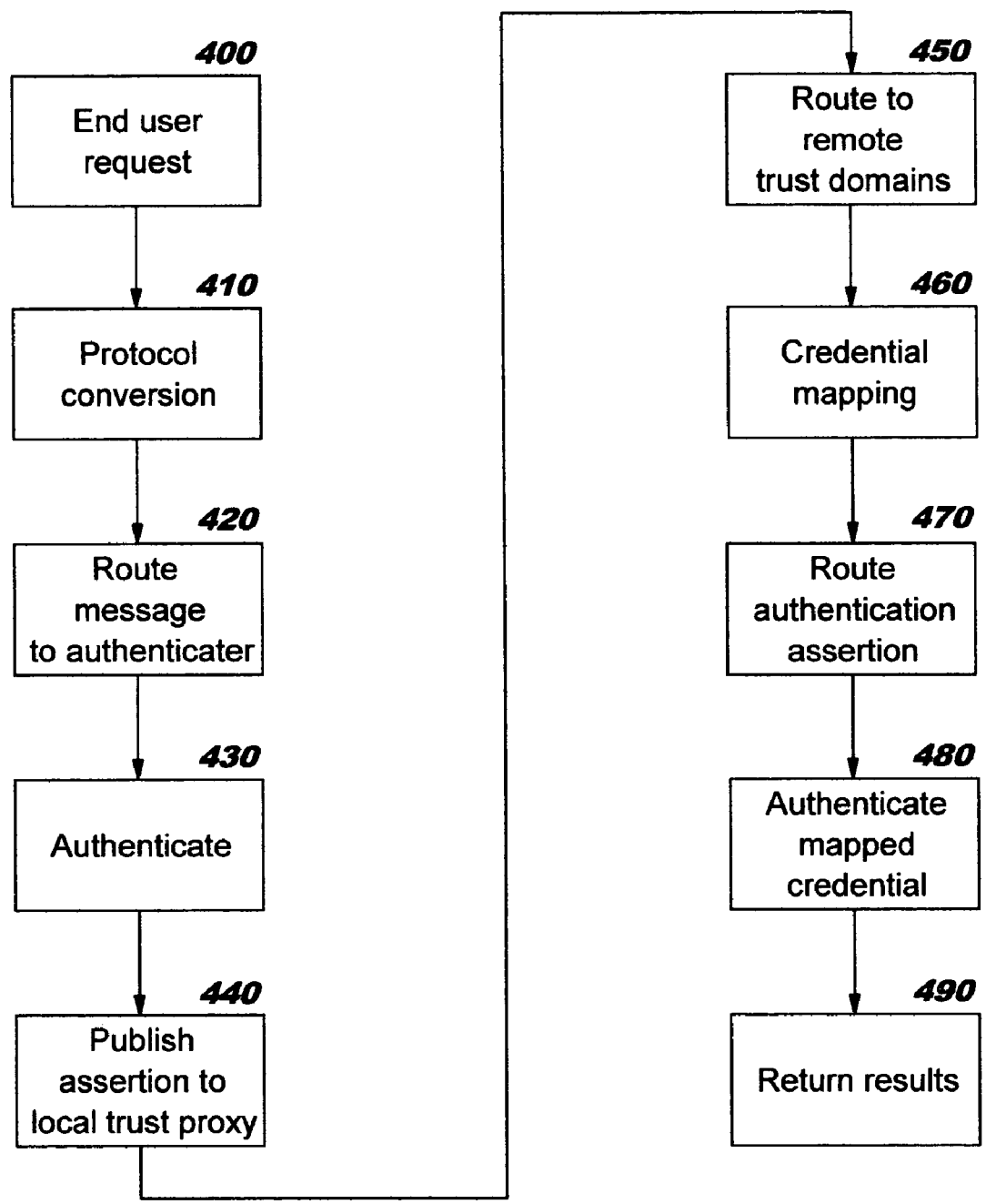
FIG. 4 provides a flowchart depicting logic that may be used to implement an embodiment of the present invention.
Figure 5:
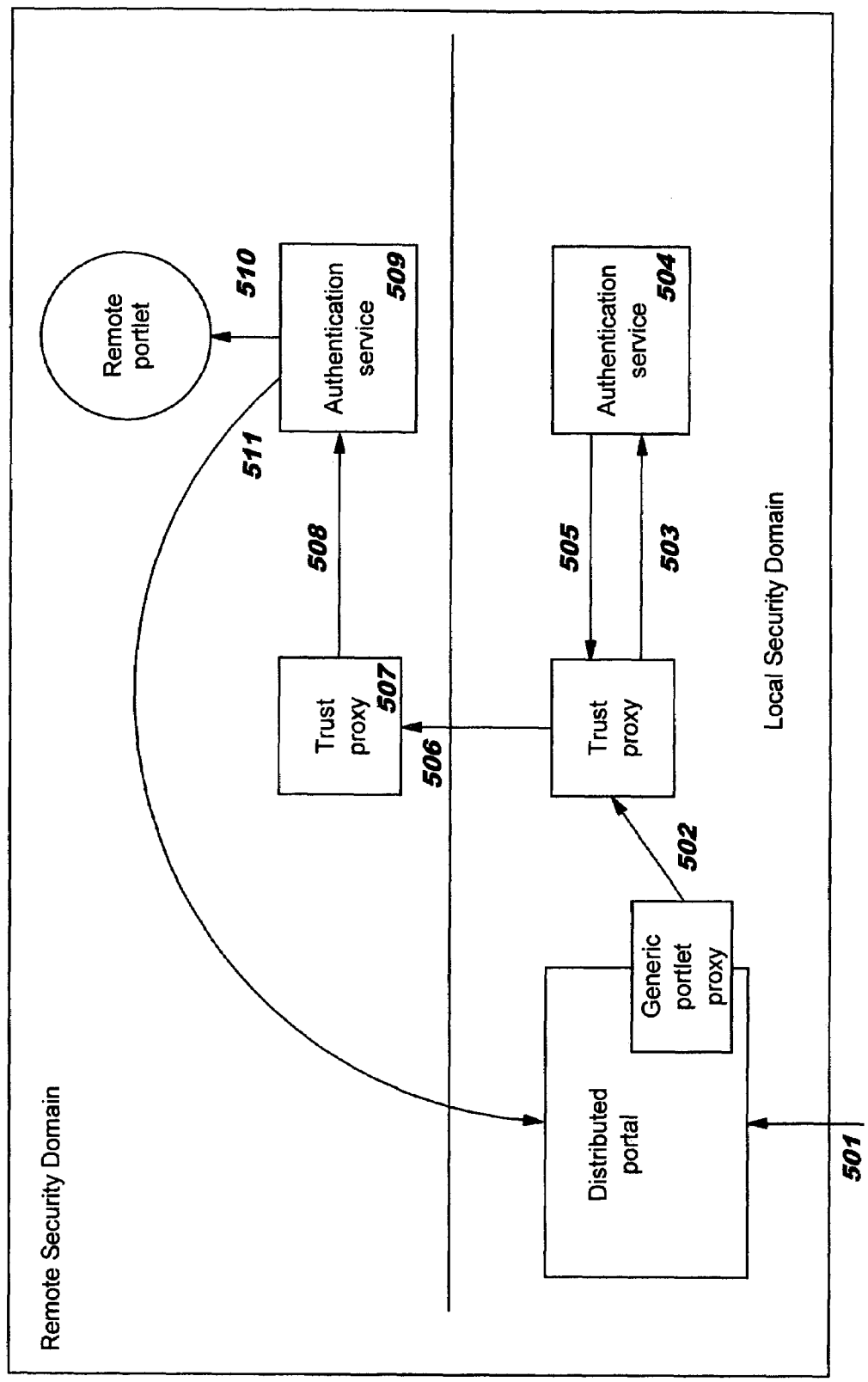
FIG. 5 shows message flows being exchanged among, and activities being carried out by, the components depicted in FIG. 2, as the logic shown in FIG. 4 is executed.

FIG. 4 illustrates logic that may be used in preferred embodiments for federating identity management within a distributed portal, and FIG. 5 shows corresponding message flows being exchanged among, and activities being carried out by, the components which were previously discussed with reference to FIG. 2. As shown at Block 400, an end user initially submits a log-in request. This log-in request preferably comprises HTTP (or HTTPS) posted form data including log-in credentials such as a user name (or user ID) and password. Message flow 501 of FIG. 5 represents the user-provided log-in request.

In the example scenario discussed with reference to FIG. 3, the log-in request at Block 400 corresponds to Sally providing her log-in credentials, as a customer of SFS, to an Internet service provider (e.g., when she is not logging in at her work location). A successful authentication thereby enables Sally to view her SFS investments 320. For purposes of the example, Sally logs in using her user ID "sally@cedar.net" and her corresponding password "federate". However, Sally also needs to be authenticated to the remote portlet which, in this example, serves account information to SFS employees regarding their employee benefits information 310. The problems associated with requiring users to separately log in to multiple applications, and with creating and maintaining separate user IDs and passwords for multiple applications, are well known. Accordingly, the federated identity management techniques disclosed herein enable users to be seamlessly and transparently authenticated to the Web services which are aggregated in the distributed portal, following a successful authentication of the initially-provided log-in credentials.

Returning to the discussion of FIG. 4, the generic portlet proxy converts the HTTP(S) request received at Block 400 to a message format understood by the local trust proxy (Block 410). This message format is preferably a SOAP message which conveys an authentication request, and is represented in FIG. 5 by message flow 502. (A sample authentication request message is depicted in FIGS. 6A and 6B, and is discussed below.)

Upon receiving the message from the generic portlet proxy, the local trust proxy routes the message (Block 420) to the local authentication service. See message flow 503. In preferred embodiments, this routing occurs as a function of policy information. That is, the local trust proxy preferably consults policy information to determine which of the other entities are allowed to receive this message (where the policy information has previously been created, for example, by a systems administrator for the local security domain). In the example, the local authentication service 252 is the only authorized recipient, and thus the message shown in FIG. 6 is forwarded to the authentication service within the local security domain (i.e., the Cedar Trail Internet domain which is Sally's service provider).

Note that, in this example, it is presumed that the service providing television listings (see reference number 330 in FIG. 3) does not require the user to be authenticated. This is primarily for purposes of illustrating that embodiments of the present invention may be used in scenarios where multiple services are involved in an aggregation, and where authentication is required for all of those services or some subset thereof.

The local authentication service uses the provided log-in credentials to authenticate the user, according to preferred embodiments, and generates an authentication assertion (Block 430). See activity 504. Authentication techniques are well known in the art, and generally comprise consulting a stored repository in which user names or user IDs are mapped to passwords to determine whether the provided log-in credentials match an entry therein.

Preferred embodiments leverage the Java™ Authentication and Authorization Service, or "JAAS", which is a pluggable framework for authentication and policy enforcement defined by Sun Microsystems, Inc. ("Java" is a trademark of Sun Microsystems, Inc.) The JAAS authentication services are Web services capable of authenticating a user based on credentials passed within an authentication request. The authentication service acts as an authentication authority and asserts successful or failed authentication requests via an authentication response when called upon (e.g., by a trust proxy) to authenticate a user. In one aspect, this authentication may comprise enumerating user names or user IDs, and their corresponding passwords, in the JAAS log-in configuration file and reading this file with a simple LoginModule. Alternatively, the log-in configuration file may be modified to use other LoginModules (i.e., authentication mechanisms) such as LDAP, Kerberos, NT active login, and others. These services are modeled as remote portlet Web services by preferred embodiments.

Preferred embodiments also leverage the WS-Security specification support for secure message exchanges among trusted parties. As disclosed therein, a security token (referred to equivalently herein as a WS-Security Security Token) is used to convey security information from one trusted party to another, and in a simple format, uses a "UsernameToken" element to encapsulate a user name and optional password. In the sample WS-Security compliant authentication request message 600 depicted in FIG. 6, the UsernameToken element is shown at reference number 630, and transmits Sally's user name 631 and password 632 which she provided in the log-in request. (Reference number 620 indicates the name of Sally's authenticating service provider.) A corresponding authentication response message (not shown) indicates its source (i.e., the authentication authority which carries out the authentication), along with an indicator of the success/failure of the authentication, and according to preferred embodiments, also returns the authenticated subject's user name within a "UsernameToken" element. Preferably, a digital signature element (see reference number 610) is used to authenticate the originator of the message sent to the trust proxy, and also to provide assurance of message integrity. (The manner in which a digital signature may be used for authentication and integrity is well known in the art, and will not be described in detail herein.)

Preferably, the trust proxy also enforces authorization decisions relative to digitally-signed messages to ensure that only authorized and valid message exchanges are allowed within the federation. For example, policy or similar authorization information is preferably consulted to determine whether the service provider identified at reference number 620 is authorized for publishing a multi-domain authentication request within the local security domain (as represented by the message type information shown with the SOAP envelope body 640 at reference number 641; note that the local security domain is referred to therein as "domain1").

Preferably, end-to-end encryption is provided for the messages being routed among the security domains to ensure that message confidentiality (and message integrity) is maintained.

Returning again to the discussion of FIG. 4, following the authentication performed at Block 430, the authentication service publishes the generated assertion (Block 440) to the local trust proxy. (That is, if the authentication was successful, this assertion indicates that the user is authentic.) See message flow 505. Upon receiving this assertion, the local trust proxy preferably validates the authenticator's digital signature and if valid, routes the assertion in a message to a peer trust proxy in one or more of the remote security domains (Block 450). See message flow 506. As discussed above with reference to Block 420, this routing at Block 450 preferably uses policy to determine the authorized recipients. In the example, the authorized recipient is remote trust proxy 231.

In addition to routing the assertion to the remote security domain, as shown by message flow 506, the trust proxy 232 preferably also returns each authentication response generated by an authentication service within the federation (such as the response published at Block 440) to the point-of-contact service (which in this case is the distributed portal 210). This has not been illustrated in FIG. 5. (The point-of-contact service preferably uses the authentication responses from the various other services when aggregating the view to be presented to the user.)

Upon receiving the message sent from the local trust proxy at Block 450, the remote trust proxy applies what is referred to herein as "credential mapping", whereby the identifying information in the message is mapped to a locally-managed identity (Block 460). Suppose, for example, that while Sally is authenticated to the local security domain using the user ID "sally@cedar.net" and corresponding password "federate", her user ID and password as an employee of SFS are "spjenkins@sfs.com" and "investments-R-Us". Accordingly, the processing at Block 460 comprises determining that the authentication assertion received from the local trust proxy is, in fact, an authentication of this same user. This credential mapping operation is shown as activity 507 in FIG. 5. (Trust proxy 231 may invoke a separate service within remote security domain 200 when performing this credential mapping, without deviating from the scope of the present invention, although this has not been shown in FIG. 5.)

Following the credential mapping, the remote trust proxy routes the authentication assertion to its own (local) authentication service (Block 470), as shown by message flow 508. Again, policy is preferably used in this routing to determine the authorized recipients. The receiving authentication service then authenticates the mapped credentials (Block 480), illustrated as activity 509, and the authentication results are then sent (Block 490) to the relying service (message flow 510) and are also preferably returned (message flow 511) to the point of contact (i.e., to the distributed portal implementation).

FIG. 7 depicts a sample response message 700 conveying authentication results for the example scenario. As shown therein, SOAP message body 740 indicates (at reference number 741) that this is a multi-domain authentication response, created within the security domain referred to as "domain2A", where the result of the authentication is "permit" (see reference number 742). This result indicates that the user to whom the user name 731 and password 732 credentials of UsernameToken 730 correspond is permitted to access the requested remote portlet 240. Reference number 720 indicates that the signer of this authentication response message is "securityGateway2A", which in the example represents authentication service 251.

As has been demonstrated, the present invention provides advantageous techniques for federated identity management within a distributed portal server. Preferred embodiments leverage open standards. Note that while particular standards (such as WS-Routing, SOAP, and so forth) have been referenced when describing preferred embodiments, this is for purposes of illustrating the inventive concepts of the present invention. Alternative means for providing the analogous functionality may be used without deviating from the scope of the present invention.

The term "service" as used herein includes a composite service, as well as the sub-services which have been aggregated to form that composite service. The term "portlet" is used herein in an illustrative sense and includes component implementations which adhere to component models other than the portlet model which has been illustrated.

Several commonly-assigned and co-pending inventions will now be discussed, and will be distinguished from the teachings of the present invention.

Commonly-assigned and co-pending U. S. Patent Application 20030135628 (Ser. No. 10/047,811), which is titled "Provisioning Aggregated Services in a Distributed Computing Environment", discloses techniques that enable heterogeneous identity systems to be joined in the dynamic, run-time Web services integration environment. This application, referred to herein as "the provisioning invention", is hereby incorporated herein by reference. A provisioning interface was disclosed in the provisioning invention to enable automatically and dynamically federating the heterogeneous identity systems which may be in use among the services which are aggregated as a composite service. The techniques disclosed therein allow users (whether human or programmatic) to be seamlessly authenticated and authorized, or "identified", for using the dynamically-integrated services. According to the provisioning invention, this seamless identification may be provided using a single sign-on, or "unified login", for an aggregated service, wherein the provisioning interface of the aggregated service can be used to solicit all required information from a user at the outset of executing the aggregated service. A "stacking" approach was described whereby user passwords (or other credentials, equivalently, such as tickets or digital certificates) to be provided to the sub-services of an aggregated service are encrypted for securely storing. The sub-services are invoked in a specified order during execution, according to a definition that is preferably specified in the Web Services Flow Language ("WSFL"), and the stacked passwords are then unstacked and presented to the appropriate authentication or authorization sub-service.

The present invention, by contrast, does not use stacking of credentials, and does not rely on a provisioning interface of a Web service. In addition, a user of the present invention is not required to provide credentials beyond those needed for the application or service to which the user is initially authenticated: according to preferred embodiments, credentials required for subsequently-accessed services are determined dynamically, using credential mapping, as discussed above.

The provisioning invention discussed publishing the provisioning interface, for each sub-service of an aggregated service, to a network-accessible registry using a WSDL document, thereby enabling the joining of identity systems for (sub-)services which are dynamically integrated. The provisioning invention also stated that the provisioning interface of the aggregated service can then be created by manually or programmatically selecting from the interfaces of the sub-services comprising the aggregation, and a WSDL document may be created for this new provisioning interface and published, in a recursive manner.

The present invention does not rely on a centrally-registered specification of the provisioning interface(s) of a Web service, nor does this type of "superset" specification need to be created for the services to be aggregated within a portal when using preferred embodiments of the present invention. Instead, preferred embodiments use trust proxies to perform domain-specific authentication, and these trust proxies communicate results of the authentication to peer trust proxies (according to policy) using security tokens.

Commonly-assigned and co-pending U.S. Patent Application 20030163513 (Ser. No. 10/081,300, which is titled "Providing Role-Based Views from Business Web Portals", discloses techniques for federating user profile information. This application, referred to herein as the role-based views application, also discloses techniques for providing this user profile information using a single sign-on approach, whereby identifying information obtained when a user begins to use a portal can be programmatically obtained and used by sub-services of an aggregated service. A federated authentication of an end user is performed (as disclosed in the provisioning invention); security attributes (such as the user's role) which are relevant for authorization are acquired, for this authenticated user; and profile data associated with these security attributes is resolved. Refer to this commonly-assigned application, which is hereby incorporated herein by reference, for more information.

The present invention is not directed toward role-based views.

Preferred embodiments of the present invention bind a federated identity system to a distributed portal model. The provisioning application and the role-based views application, in contrast, assume that each Web service implements its own authentication and authorization operations. As a result, the provisioning application and the role-based views application do not address security domain scenarios where trust, authentication, and/or authorization authorities implement a collective quality of protection spanning distributed services. Enterprise computing environments are expected to deploy applications and services in interconnected and/or disparate domains to achieve desirable scaling, security, and/or other relevant operational characteristics. This model is supported by embodiments of the present invention, and is in contrast to the model used in the provisioning application and the role-based views application.

The present invention enables autonomous security domains which contain Web services, portlets, and principals to be aggregated through a portal platform.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects.

Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of providing cross-domain authentication in a computing environment, comprising:

providing security credentials of an entity to an initial point of contact that provides content aggregation in the computing environment;

passing the provided credentials from the initial point of contact to a local trust proxy in a local security domain of the initial point of contact;

authenticating the entity with an authentication service in the local security domain, using the passed credentials, for accessing content from at least one local content service, each of the at least one local content services operable to provide its content from the local security domain for aggregation, by the initial point of contact, in an aggregated view;

responsive to a successful outcome of the authenticating, forwarding an authentication assertion for the successful outcome to a remote trust proxy in each of at least one selected remote security domains, the authentication assertion comprising an identification of the entity;

using the identification from the authentication assertion, by the remote trust proxy in each of the at least one selected remote security domains, to locate previously-stored security credentials usable for authenticating the entity in that remote security domain, wherein the located security credentials usable for authenticating the entity in at least one of the selected remote security domains differ from the security credentials of the entity provided to the initial point of contact; and authenticating the entity with an authentication service in each of the at least one selected remote security domains, using the located security credentials usable for authenticating the entity in that remote security domain, for accessing other content from at least one remote content service that is operable in that remote security domain to provide its content from that remote security domain for aggregation, by the initial point of contact, in the aggregated view.

2. The method according to claim 1, wherein the forwarding further comprises consulting policy information to determine which of a plurality of remote security domains should be selected as the at least one selected remote security domains.

3. The method according to claim 1, wherein the using the identification to locate previously-stored security credentials and the authenticating the entity using the located security credentials enable accessing the other content from remote content services in the selected remote security domains without requiring the entity to provide the previously-stored security credentials to the initial point of contact.

4. The method according to claim 1, wherein the entity is an end user.

5. The method according to claim 1, wherein the initial point of contact is a portal interface.

6. The method according to claim 1, wherein the passing is performed by a proxy of the initial point of contact.

7. The method according to claim 6, wherein the proxy of the initial point of contact performs a protocol conversion, when passing the provided credentials, from a first protocol used in the providing to a second protocol used by the trust proxy.

8. The method according to claim 7, wherein the first protocol is Hypertext Transfer Protocol ("HTTP") or a security-enhanced version thereof.

9. The method according to claim 7, wherein the second protocol is Simple Object Access Protocol ("SOAP").

10. The method according to claim 1, further comprising forwarding the authentication assertion, by the remote trust proxy in each of the at least one selected remote security domains, to the authentication service in that remote security domain, which relies on the forwarded authentication assertion when authenticating the entity using the located security credentials.

11. The method according to claim 10, wherein the successful outcome of authenticating in the local security domain and results of the authenticating each of the selected remote security domains are returned to the initial point of contact for use when creating the aggregated view.

12. The method according to claim 11, further comprising using the returned successful outcome and the returned results of the authenticating in each of the selected remote security domains to determine, by the initial point of contact, which of the content and the other content can be aggregated by the initial point of contact in the aggregated view.

13. The method according to claim 1, further comprising rendering, by the initial point of contact, the aggregated view.

14. A system for enabling an entity to have seamless access to a plurality of aggregated services which have different identity requirements, comprising:
   at least one computer, each comprising a processor; and
   instructions which execute on at least one of at least one computers, using the processor of the computer, to implement functions comprising:
   initially authenticating the entity, by a first authentication component in a local security domain, for access to a first service in the local security domain using an identity provided by the entity using an aggregation interface in the local security domain;
   mapping the provided identity, in each of at least one remote security domains, to the different identity requirements of at least one other service which is provided by that remote security domain and which is to be aggregated with the first service, thereby establishing mapped identity requirements for each of the at least one other services;
   subsequently authenticating the entity, by an authentication component in each of the at least one remote security domains, for access to each of the at least one other services which is provided by that remote security domain, using the mapped identity requirements; and
   aggregating each of the at least one other services and the first service, if the authentications thereof are successful, into an aggregated result accessible from the aggregation interface in the local security domain.

15. The system according to claim 14, wherein the aggregated result is an aggregated view.

16. The system according to claim 14, wherein the entity is a programmatic entity.

17. A computer program product for providing federated identity management within a distributed content aggregation framework, the computer program product embodied on one or more computer-usable storage media and comprising computer-usable program code for:
   providing, to the content aggregation framework by a using entity, initial identity information that identifies the using entity for accessing a first content source that is operable within a first security domain in which the content aggregation framework is operable;
   authenticating the using identity, using the initial identity information, by a first authentication service in the first security domain;
   conveying results of the authentication by the first authentication service to at least one selected other authentication service, each of which is associated with a remote security domain that is distinct from the first security domain, along with the initial identity information;
   using, in each remote security domain, the conveyed initial identity information to locate previously-stored identity information usable for authenticating the using identity in the remote security domain;
   using the located identity information, in each of the remote security domains, to authenticate the using entity to each of the selected other authentication services for accessing a remote content source operable within the remote security domain that is associated with that selected other authentication service, without requiring the using entity to provide the previously-stored identity information to the content aggregation framework; and
   aggregating content from the first content source and other content from each of the remote content sources for presentation in an aggregated view rendered by the content aggregation framework.

18. The computer program product according to claim 17, wherein the initial identity information is a name and password associated with the using entity.

\* \* \* \* \*